J. T. RAWSTHORNE & J. PRYKE.

PANTOGRAPH ENGRAVING MACHINE.

APPLICATION FILED JUNE 11, 1909.

2 SHEETS—SHEET 1.

Reissued July 13, 1909.

12,989.

WITNESSES.

E. Howard

Joseph Bates.

INVENTORS.

John Pryke

J. T. Rawsthorne by J. A. Wanamaker atty.

ANDREW B. GRAHAM CO., PHOTO-LITHOGRAPHERS, WASHINGTON, D. C.

J. T. RAWSTHORNE & J. PRYKE.

PANTOGRAPH ENGRAVING MACHINE.

APPLICATION FILED JUNE 11, 1909. 2 SHEETS—SHEET 2.

Reissued July 13, 1909. 12,989.

WITNESSES.

E. Howard

Joseph Bates.

INVENTORS.

John Pryke

J. T. Rawsthorne by Wm. den O'Brien atty.

ANDREW B. GRAHAM CO., PHOTO-LITHOGRAPHERS, WASHINGTON, D. C.

UNITED STATES PATENT OFFICE.

JOSEPH TWEEDALE RAWSTHORNE AND JOHN PRYKE, OF DINTING, ENGLAND.

PANTOGRAPH ENGRAVING-MACHINE.

No. 12,989. Specification of Reissued Letters Patent. Reissued July 13, 1909.

Original No. 921,737, dated May 18, 1909, Serial No. 396,252. Application for reissue filed June 11, 1909. Serial No. 501,679.

*To all whom it may concern:*

Be it known that we, JOSEPH TWEEDALE RAWSTHORNE and JOHN PRYKE, British subjects, and residents of Dinting, county of Derby, England, have invented certain new and useful Improvements in Pantograph Engraving-Machines, of which the following is a specification.

This invention relates to certain improvements in pantograph engraving machines employed for indenting a roller or die with a desired pattern such as described in the specification of Barr's Patent No. 824088.

It is designed to enable the pantograph engraving machine to be more successfully employed for engraving rollers, dies or other metal cylinders with varying gradations of light and shade required in the pattern thereon.

It consists essentially in the addition to the machine, or in substitution for the punch thereon, of a drill by which the indents which have been punched in the die or roller by the punch can be cleared of all burs to provide a clean circular indent or dot.

The invention will be fully described with reference to the accompanying drawings forming part of the specification.

Figure 1:
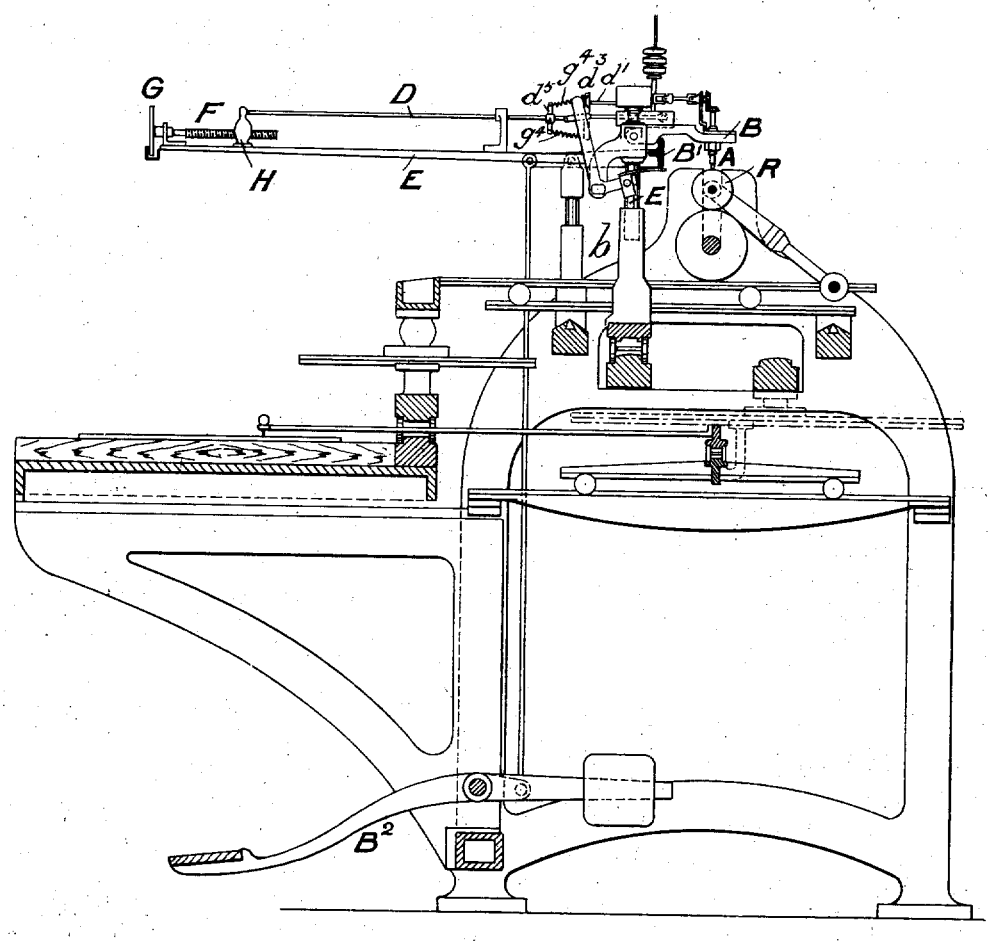
Figure 2:
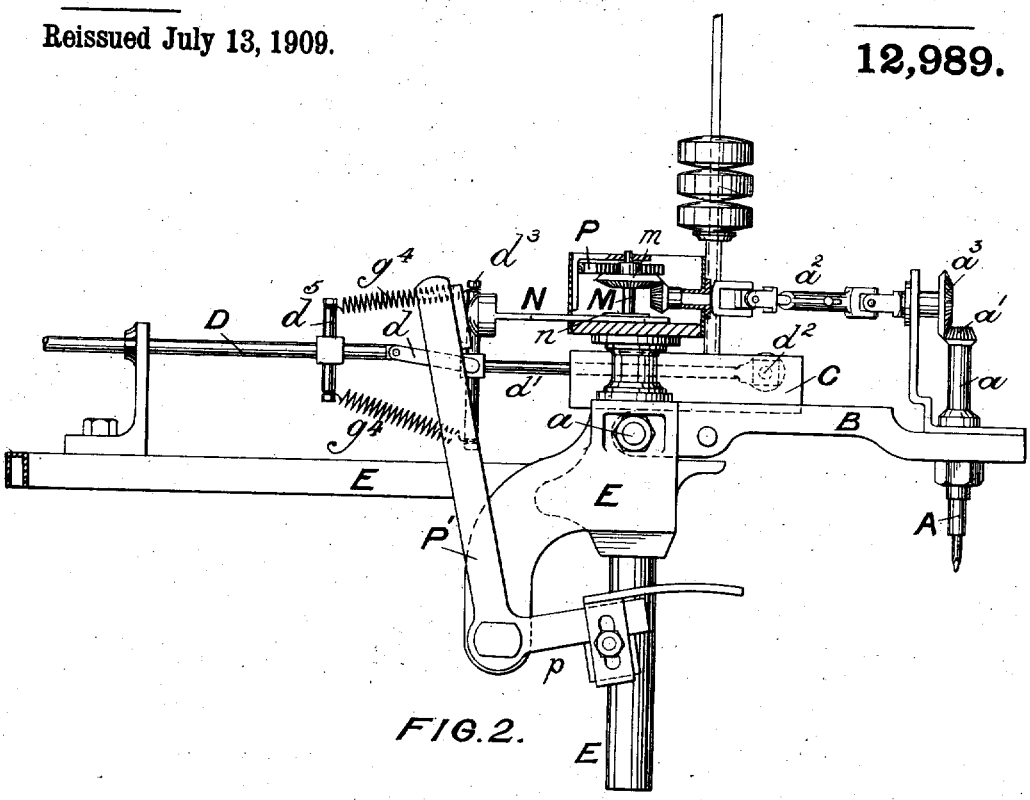
Figure 3:
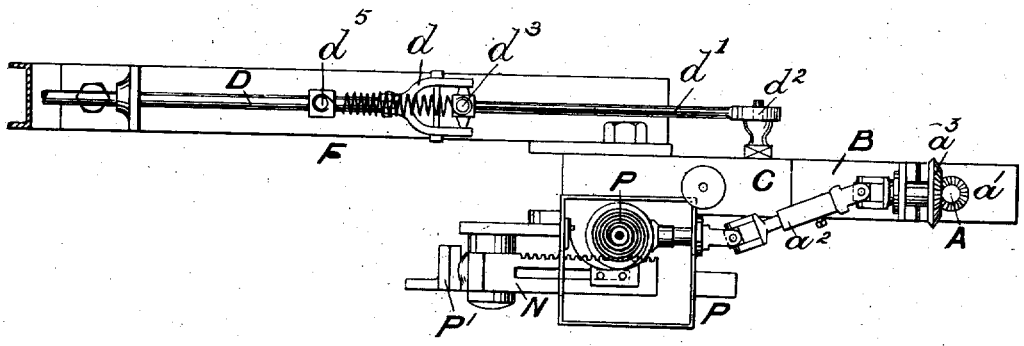

Figure 1. Side elevation of a pantograph engraving machine with the invention applied thereto. Fig. 2. Side elevation enlarged of the drilling mechanism removed from the machine. Fig. 3. Plan of Fig. 2.

The machine is constructed in the usual way as described in the former specification.

A bracket E which may be substituted for the punch bracket with a pivoted arm or bar B is socketed in the upright stand or bracket $b$ of the machine carried by the movable bed. At the outer end of the pivoted bar or arm B a rotary drill A is mounted in suitable bearings. The vertical drill spindle $a$ is fitted at its upper end with a driving wheel $a'$ which is driven by a horizontal shaft $a^2$ and wheel $a^3$, and this in turn is operated by a vertical spindle M with gearing $m$. The vertical spindle M is driven in one direction by a horizontally sliding rack N which gears with a pinion $n$ on the spindle and in the reverse direction by a helical spring P. The rack N is moved inward by a bell crank lever P′ the upper end of which is moved forward each time the drill A is lowered into one of the dots or indents in the die or roller R.

The transverse bar B′ on which the drill arm B rests and by which it is lowered when the treadle $B^2$ is depressed extends across the machine and the lower member $p$ of the bell crank lever P′ rests against it so that each downward movement of the transverse bar B′ to lower the drill also rocks the bell crank lever P′ and rotates the drill A.

The horizontal shaft $a^2$ is preferably arranged as shown with two universal joints though the bar B may be so shaped and the drill so arranged that a straight shaft may be employed but in the drawing it is shown as an example applied to the existing punch arm B without alteration. The drill may be applied to the same machine as that to which the punch is applied, the punch being removed and the drill substituted therefor either on the punch bracket or on a substituted drill bracket. Or in other instances the punch may be used on one machine and the drill be used on another machine, the work being transferred from the one machine to the other.

The drill is weighted in the usual way by a sliding weight C. To the sliding weight C an adjusting rod D is connected by which the position of the weight C upon the bar B can be altered to give the desired weight to the drill. The adjusting rod D extends out to the front of the machine to within reach of the hand of the operator so that by moving it he can without rising from his seat and leaving the pattern table of the machine thereby move the weight and adjust its position relatively to the drill. The adjusting rod D is connected to the weight C by a double jointed link $d$ and a radius rod $d'$ on a pivot $d^2$. The radius rod $d'$ is fitted at the joint end with a cross bar $d^3$ extending above and below the joint. Springs $g^4$ are attached to the top and bottom ends of the cross bars and to a collar or bar $d^5$ on the adjusting rod D at the other side of the joint to give the desired rigidity to the joint and prevent the link $d$ falling or sagging.

A screw F is fitted to the rod D passing through a sliding nut H to which the rod is attached preferably near the front end with a hand wheel or knob G to rotate the screw whereby the rod may be drawn backward or forward to adjust and regulate the weight C.

The engraver without moving from his place at the pattern plate—by turning the screw and moving the rod D can adjust the position of the weight C and force of the blow and thereby graduate the shade of the pattern on the die either lighter or darker as required by the pattern.

What we claim as our invention and desire to protect by Letters Patent is:—

1. In a pantograph engraving machine of the type referred to the combination with the pivoted arm B and means for operating the said arm, of a drill mounted thereon, a rotary shaft and gearing connected with the drill and means for rotating the shaft by which the drill is operated on the falling of the arm B substantially as described.

2. In a pantograph engraving machine of the type referred to the combination with the pivoted arm B and means for operating the said arm of a drill mounted in the said arm, shafts and gearing by which the falling of the arm rotates the drill, a sliding rack to operate the shafts and a pivoted cranked lever engaging the sliding rack by which the drill is operated when the arm B is lowered substantially as described.

3. In a pantograph engraving machine of the type referred to the combination with the pivoted arm B and means for operating the said arm of a drill mounted in the said arm means by which the falling of the arm B rotates the drill, an adjustable sliding weight C on the said arm, a rod D pivotally connected with the said weight extending toward the front of the machine within reach of the operator, and a bracket supporting the said rod affixed to the machine substantially as described.

4. In a pantograph engraving machine of the type referred to the combination with the pivoted arm B and means for operating the said arm of a drill mounted in the said arm means by which the falling of the arm B rotates the drill, an adjustable sliding weight C on the said arm, a rod D pivotally connected with the said weight extending toward the front of the machine within reach of the operator, a radius rod $d'$ interposed between the rod D and the weight, a double jointed link $d$ connecting the radius rod $d'$ with the adjusting rod D, a cross bar $d^3$ on the end of the radius rod, a collar $d^5$ on the adjusting rod, and springs $g^4$ attached to the said cross bar and collar to give the desired amount of rigidity to the flexible joint substantially as described.

5. In a pantograph engraving machine of the type referred to the combination with the pivoted arm B and means for operating the said arm of a drill mounted in the said arm means by which the falling of the arm B rotates the drill, an adjustable sliding weight C on the said arm, a rod D pivotally connected with the said weight extending toward the front of the machine within reach of the operator, the connecting link $d$ the radius rod $d'$ interposed between the rod D and the weight and springs $g^4$ forming a flexible joint, the bracket E to support the adjusting rod D, a movable nut H on the end of the adjusting rod, a screw F engaging therewith by which to operate the rod and a hand wheel G to rotate the screw substantially as described.

In witness whereof, we have hereunto signed our names in the presence of two subscribing witnesses.

JOSEPH TWEEDALE RAWSTHORNE.
JOHN PRYKE.

Witnesses:
I. OWDEN O'BRIEN,
B. LATHAM WOODHEAD.